(12) United States Patent
Uchimura et al.

(10) Patent No.: US 7,999,056 B2
(45) Date of Patent: Aug. 16, 2011

(54) CONTINUOUS PRODUCTION METHOD AND PRODUCTION APPARATUS OF AROMATIC POLYCARBONATE

(75) Inventors: Ryuuji Uchimura, Fukuoka (JP); Toshiyuki Hamano, Mie (JP); Kazuyuki Takahashi, Fukuoka (JP); Masaaki Miyamoto, Kitakyushu (JP); Kodama Miyamoto, legal representative, Fukuoka (JP); Taro Miyamoto, legal representative, Fukuoka (JP); Hideo Miyamoto, legal representative, Fukuoka (JP); Hanae Miyamoto, legal representative, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 12/375,136

(22) PCT Filed: May 22, 2007

(86) PCT No.: PCT/JP2007/060463
§ 371 (c)(1), (2), (4) Date: Oct. 2, 2009

(87) PCT Pub. No.: WO2008/012987
PCT Pub. Date: Jan. 31, 2008

(65) Prior Publication Data
US 2010/0273973 A1 Oct. 28, 2010

(30) Foreign Application Priority Data

Jul. 26, 2006 (JP) ................. P2006-203616
Nov. 30, 2006 (JP) ................. P2006-324382

(51) Int. Cl.
*C08G 64/00* (2006.01)
*C08G 63/02* (2006.01)
(52) U.S. Cl. ...................... 528/196; 528/198

(58) Field of Classification Search .............. 528/196, 528/198
See application file for complete search history.

(56) References Cited

U.S. PATENT DOCUMENTS

| 6,252,034 B1 * | 6/2001 | Uenishi et al. ............. 528/196 |
| 6,277,946 B1 | 8/2001 | Van Heijkant et al. |
| 7,326,467 B2 * | 2/2008 | Nakano et al. ............. 428/412 |

FOREIGN PATENT DOCUMENTS

| JP | 2001 226478 | 8/2001 |
| JP | 2003 12792 | 1/2003 |
| JP | 2003 138002 | 5/2003 |
| JP | 2003 192782 | 7/2003 |
| JP | 2003 523429 | 8/2003 |
| JP | 2004 18624 | 1/2004 |
| JP | 2004 26916 | 1/2004 |

OTHER PUBLICATIONS

U.S. Appl. No. 12/519,205, filed Jun. 15, 2009, Takahashi, et al.
Office Action Issued Sep. 9, 2010, in Chinese Patent Application No. 200780018458.8 (with English-language Translation).
Office Action issued Dec. 16, 2010, in European Patent Application No. 07 743 897.6-2102.

* cited by examiner

*Primary Examiner* — Terressa M Boykin
(74) *Attorney, Agent, or Firm* — Oblon, Spivak, McClelland, Maier & Neustadt, L.L.P.

(57) ABSTRACT

The object of the present invention is to provide a method of producing plural kinds of aromatic polycarbonates by a melt process without changeover loss and quality deterioration. The present invention relates to a production method of an aromatic polycarbonate, comprising supplying a molten mixture of raw materials of an aromatic dihydroxy compound and/or a carbonic diester prepared in the absence of an ester exchange catalyst to polycondensation steps of two lines each equipped with three vertical reactors connected in series and one horizontal reactor, and at the same time, continuously conducting polycondensation reaction in the presence of an ester exchange catalyst.

7 Claims, 4 Drawing Sheets

CONTINUOUS PRODUCTION METHOD AND PRODUCTION APPARATUS OF AROMATIC POLYCARBONATE

TECHNICAL FIELD

The present invention relates to a continuous production method of an aromatic polycarbonate, and more particularly, it relates to a continuous production method of an aromatic polycarbonate, having plural lines of polycondensation steps.

BACKGROUND ART

Aromatic polycarbonates have excellent mechanical properties such as impact strength, heat resistance, transparency and the like, and are widely used to applications such as various machine parts, optical discs and automobile parts.

A method of directly reacting bisphenols such as bisphenol A and phosgene (interfacial method) and a method of polycondensation reacting bisphenols such as bisphenol A and carbonic diesters such as diphenyl carbonate by an ester exchange reaction (melt process) are known as production methods of such aromatic polycarbonates. Above all, the melt process by an ester exchange reaction has the advantage that aromatic polycarbonates can be produced inexpensively as compared with the interfacial method.

By the way, aromatic polycarbonates are used to many applications, and therefore it is necessary to produce plural kinds of aromatic polycarbonates. On the other hand, when aromatic polycarbonates are produced by the above-described melt process, the production is generally conducted using a production apparatus comprising plural reactors which are connected in series under reduced pressure. Therefore, where reaction conditions such as molar ratio of starting materials charged are changed, changeover loss is generated until obtaining the desired kind of an aromatic polycarbonate.

As a method of diminishing such a changeover loss and quality deterioration, a method of continuously producing plural kinds of aromatic polycarbonates is reported, comprising in a production apparatus comprising plural reactors which are connected, polycondensing bisphenol A and diphenyl carbonate in a previous stage reactor (first stage polymerization step), and pluralizing polycondensation reaction (late polymerization step) subsequently conducted (see Patent Document 1).

Patent Document 1: JP-A-2004-26916

DISCLOSURE OF THE INVENTION

Problems that the Invention is to Solve

The reaction between diphenyl carbonate and bisphenol A is carried out in the presence of an ester exchange catalyst using a production apparatus comprising plural reactors which are connected, as described in Patent Document 1. The ester exchange catalyst is used in a small amount, and many of those easily dissolve in water. Therefore, the ester exchange catalyst is previously prepared in a form of an aqueous solution, and in many cases, such an aqueous solution is supplied to a melt mixing tank of starting monomers or the subsequent reactor.

However, when the catalyst was supplied to the melt mixing tank or the reactor, unexplained trouble occurred that the polymer obtained does not reach the target molecular weight. For the above reason, it was obliged to change operation conditions such as polymerization temperature, polymerization pressure and residence time, and as a result, there were the problems that quality of hue deteriorates and a product having the desired molecular weight is not obtained.

The present invention has been made to solve the problems in the production of an aromatic polycarbonate by such a melt process.

That is, one object of the present invention is to provide a continuous production process of an aromatic polycarbonate having diminished changeover loss and quality deterioration in a process of producing plural kinds of aromatic polycarbonates by the melt process.

Further, another object of the present invention is to provide a production apparatus of an aromatic polycarbonate, which is capable of producing plural kinds of aromatic polycarbonates without generation of changeover loss and the like.

Means for Solving the Problems

According to the present invention, there is provided a continuous production method of an aromatic polycarbonate which is a method of continuously producing an aromatic polycarbonate by melt polycondensation with an ester exchange reaction between an aromatic dihydroxy compound and a carbonic diester, and is characterized by having a raw material preparation step of preparing a molten mixture of raw materials of an aromatic dihydroxy compound and/or a carbonic diester in the absence of an ester exchange catalyst (hereinafter sometimes referred to a "raw material preparation step"), and a polycondensation step of polycondensing the molten mixture of raw materials prepared in the raw material preparation step in the presence of an ester exchange catalyst using a plurality of reactors, and having plural lines of polycondensation steps per one line of the raw material preparation step.

In the production method of an aromatic polycarbonate to which the present invention is applied, it is preferable to add at least any one selected from an aromatic dihydroxy compound, a carbonic diester, an ester exchange catalyst, an end terminator, an additive and a thermoplastic resin to the raw material preparation step or the subsequent steps.

In the continuous production method of an aromatic polycarbonate to which the present invention is applied, it is preferable to produce the same single kind and/or different plural kinds of aromatic polycarbonates in plural lines of the polycondensation step.

Further, in the production method of an aromatic polycarbonate to which the present invention is applied, it is preferable to filter at least any one selected from an aromatic dihydroxy compound, a carbonic diester, an ester exchange catalyst, an end terminator, an additive and a thermoplastic resin with a filter, and then add the same to the raw material preparation step or the subsequent steps.

In particular, when a carbonic diester is additionally added to the raw material preparation step or the subsequent steps, it is preferable that the carbonic diester filtered with a filter is added in a range such that a molar ratio of raw materials of (carbonic diester/aromatic dihydroxy compound) is from 1.0 to 1.3, preferably from 1.00 to 1.30, and more preferably from 1.001 to 1.300, and solution polycondensation is then conducted in the presence of an ester exchange catalyst.

Where the molar ratio of raw materials is lower than 1.0, reactivity is high, but the amount of terminal OH groups increases, and as a result, thermal stability, hydrolysis resistance and the like deteriorate. Further, where the ratio exceeds 1.3, it is difficult to obtain a polycarbonate having the desired molecular weight.

Next, according to the present invention, there is provided a production apparatus of an aromatic polycarbonate, characterized by having a melt mixing tank which prepares a molten mixture of raw materials of an aromatic dihydroxy compound and/or a carbonic diester in the absence of an ester exchange catalyst, and at least two lines of polycondensation reactors which continuously conduct polycondensation reaction of the molten mixture of raw materials prepared in the melt mixing tank, in the presence of an ester exchange catalyst.

The polycondensation reactors preferably have a plurality of vertical reactors which are connected in series, and at least one horizontal reactor subsequent to the vertical reactor.

Advantage of the Invention

According to the present invention, changeover loss and quality deterioration diminish in the continuous production of an aromatic polycarbonate.

DESCRIPTION OF REFERENCE NUMERALS AND SIGNS

1$f$ . . . Filter
2$a$ . . . First raw material mixing tank
2$b$ . . . Second raw material mixing tank
3$a$, 3$b$ . . . Anchor type stirring blade
4$a$, 4$b$ . . . Raw material supply pump
5$a$, 5$b$ . . . Catalyst supply port
6$a$ 6$d$ . . . First vertical reactor
6$b$, 6$e$ . . . Second vertical reactor
6$c$, 6$f$ . . . Third vertical reactor
7$a$, 7$b$, 7$c$, 7$d$, 7$e$, 7$f$ . . . MAXBLEND blade
8$a$, 8$b$, 8$c$, 8$d$, 8$e$, 8$f$, 81, 82 . . . By-product discharge pipe
9$a$, 9$b$ . . . Fourth horizontal reactor
10$a$, 10$b$ . . . Lattice-type blade
11$a$, 11$b$ . . . Extruder
12$a$, 12$b$, 12$c$, 12$d$, 12$e$, 12$f$ . . . Additive supply port
13$a$, 13$b$ . . . Strand bath
14$a$, 14$b$ . . . Strand cutter
15$a$, 15$b$ . . . Centrifugal hydrator
16$a$, 16$b$, 16$c$, 16$d$ . . . Product silo

BEST MODE FOR CARRYING OUT THE INVENTION

The best mode for carrying out the invention (hereinafter, the embodiment of the invention) is described in detail below. The present invention is not limited to the following embodiments, and can carry out with various modifications within a scope of its gist. Further, the drawings used are to explain the present embodiment, and do not show the actual size.
(Aromatic Polycarbonate)

In the present invention, an aromatic polycarbonate is produced by polycondensation based on an ester exchange reaction between an aromatic dihydroxy compound and a carbonic diester. The polycondensation reaction is conducted in a production apparatus equipped with plural polymerization lines after preparing an aromatic dihydroxy compound and a carbonic diester which are raw materials, and one kind or plural kinds of aromatic polycarbonates are simultaneously produced.

A method of producing an aromatic polycarbonate by using an aromatic dihydroxy compound and a carbonic diester as raw materials, and conducting polycondensation reaction in the presence of an ester exchange catalyst is described below.
(Aromatic Dihydroxy Compound)

The aromatic dihydroxy compound used in the present embodiment includes a compound represented by the following general formula (1).

[Chem. 1]

General Formula (1)

In the general formula (1), A represents a single bond, a straight-chain, branched or cyclic divalent hydrocarbon group having from 1 to 10 carbon atoms which may be substituted, or a divalent group represented by —O—, —S—, —CO— or $SO_2$—. X and Y represent a halogen atom or a hydrocarbon group having from 1 to 6 carbon atoms. p and q are an integer of 0 or 1. X and Y, and p and q may be the same or different, respectively.

Specific examples of the aromatic dihydroxy compound include bisphenols such as bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane and 1,1-bis(4-hydroxyphenyl)-cyclohexane; biphenols such as 4,4'-dihydroxybiphenyl and 3,3',5,5'-tetramethyl-4,4'-dihydroxybiphenyl; bis(4-hydroxyphenyl)sulfone, bis(4-hydroxyphenyl) sulfide, bis(4-hydroxyphenyl)ether, and bis(4-hydroxyphenyl)ketone.

Of those, 2,2-bis(4-hydroxyphenyl)propane (bisphenol A, hereinafter sometimes abbreviated as BPA) is preferable. Those aromatic dihydroxy compounds can be used alone or as mixtures of two or more thereof.
(Carbonic Diester)

The carbonic diester used in the present embodiment includes a compound represented by the following general formula (2)

[Chem. 2]

General Formula (2)

In the general formula (2), A' represents a straight-chain, branched or cyclic monovalent hydrocarbon group having from 1 to 10 carbon atoms which may be substituted. Two A's may be the same or different.

Examples of the substituent on A' include a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Specific examples of the carbonic diester include diphenyl carbonate; a substituted diphenyl carbonate such as ditolyl carbonate; and a dialkyl carbonate such as dimethyl carbonate, diethyl carbonate and di-t-butyl carbonate.

Of those, diphenyl carbonate (hereinafter sometimes abbreviated as DPC) and a substituted diphenyl carbonate are preferable. Those carbonic diesters can be used alone or as mixtures of two or more thereof.

The carbonic diester may be replaced by dicarboxylic acid or dicarboxylic ester in an amount of preferably 50 mol % or less, and more preferably 30 mol % or less.

The representative dicarboxylic acid or dicarboxylic ester includes terephthalic acid, isophthalic acid, diphenyl terephthalate, diphenyl isophthalate and the like. When such a dicarboxylic acid or dicarboxylic ester is co-used, a polyester carbonate is obtained.

Those carboxylic diesters (including the above replaced dicarboxylic acid or dicarboxylic ester, and hereinafter the same) are used in an amount excess to the dihydroxy compound.

Specifically, the carboxylic diester is generally used in a molar ratio of from 1.0 to 1.3 to the aromatic dihydroxy compound. Under the same reaction conditions, there is the tendency that reaction rate increases as the molar ratio decreases, thereby increasing a viscosity average molecular weight of the aromatic polycarbonate. Further, when the molar ratio increases in this range, reaction rate decreases, and there is the tendency that the viscosity average molecular weight decreases.

Where the molar ratio is excessively small, reactivity becomes high, but the amount of terminal OH group of an aromatic polycarbonate obtained by polycondensation increases, and thermal stability, hydrolysis resistance and the like tend to deteriorate. Further, where the molar ratio is excessively large, there is the tendency that it is difficult to produce an aromatic polycarbonate having the desired molecular weight.

(Ester Exchange Catalyst)

The ester exchange catalyst used in the present embodiment includes catalysts generally used in producing an aromatic polycarbonate by an ester exchange method, and is not particularly limited. In general, examples of the catalyst include basic compounds such as an alkali metal compound, a beryllium or magnesium compound, an alkaline earth metal compound, a basic boron compound, a basic phosphorus compound, a basic ammonium compound, and an amine compound.

Of those ester exchange catalysts, an alkali metal compound is practically desirable. Those ester exchange catalysts may be used alone or as mixtures of two or more thereof.

The ester exchange catalyst is used in a range of from generally from $1 \times 10^{-9}$ to $1 \times 10^{-1}$ mol, and preferably from $1 \times 10^{-7}$ to $1 \times 10^{-2}$ mol, per mole of the aromatic dihydroxy compound.

The alkali metal compound includes inorganic alkali metal compounds such as hydroxides, carbonates and hydrogen carbonate compounds of alkali metals; and organic alkali metal compounds such as salts of alkali metal salts with alcohols, phenols or organocarboxylic acids. Examples of the alkali metal include lithium, sodium, potassium, rubidium and cesium.

Of those alkali metal compounds, a cesium compound is preferable, and cesium carbonate, cesium hydrogen carbonate and cesium hydroxide are particularly preferable.

Examples of the beryllium or magnesium compound and the alkaline earth metal compound include inorganic alkaline earth metal compounds such as hydroxides or carbonates of beryllium, magnesium and alkaline earth metals; and salts of those metals with alcohols, phenols and organocarboxylic acids. Examples of the alkaline earth metal include calcium, strontium and barium.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butylphosphine, triphenylphosphine and tributylphosphine; and quaternary phosphonium salts derived from those compounds.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonim hydroxide, benzyltriphenylammonium hydroxide, methyltriphenylammonium hydroxide and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline.

(Continuous Production Method of Aromatic Polycarbonate)

A continuous production method of an aromatic polycarbonate to which the present embodiment is applied is described below.

In the present embodiment, the production of an aromatic polycarbonate is conducted by preparing a mixture in the desired molar ratio of an aromatic dihydroxy compound and a carbonic diester compound as raw materials in the absence of an ester exchange catalyst (raw material preparation step) and subjecting those compounds to a multi-stage polycondensation reaction in the presence of an ester exchange reaction catalyst under a molten state using a plurality of reactors by a production apparatus having plural lines of polycondensation steps (polycondensation step). The reaction method may be any of a batchwise method, a continuous method, and a combination of a batchwise method and a continuous method. The reactors used comprise a plurality of vertical reactors and the subsequent at least one horizontal reactor. In general, those reactors are arranged in series, and treatment is conducted continuously.

After the polycondensation step, unreacted raw materials and reaction by-products in a molten reactant are removed (devolatilization step), and the aromatic polycarbonate cooled is formed into pellets having a given particle size (pelletization step).

In the present embodiment, it is preferable to add at least any one selected from an aromatic dihydroxy compound, a carbonic diester, an ester exchange catalyst, an end terminator, an additive and a thermoplastic resin to the raw material preparation step or the subsequent steps.

Specifically, it is preferable in the points of reaction control and quality adjustment to add the aromatic dihydroxy compound, carbonic diester and ester exchange catalyst in the course of transfer from the raw material preparation step to the polycondensation step, or at the initial stage of the polycondensation step.

Further, it is suitable for the addition purpose to add the end terminator and additive at the final stage of the polycondensation step, during transfer from the polycondensation step to the devolatilization step, or at the initial stage of the devolatilization step.

The addition time of the thermoplastic resin is not particularly limited, but when the devolatilization step is conducted using an extruder, it is general to add the same at this step.

In this case, it is preferable that those compounds are filtered with a given filter and added in the raw material preparation step or the subsequent steps.

As the form of the filter, conventional filters such as a candle type, a pleat type and a leaf disc type can be used without particular limitation. Material of the filter is not particularly limited so far as it is inert to the above-described compounds and does not contain elution components. In general, metals, particularly a stainless steel, are used, and for example, SUS304 and SUS316 are preferably used.

The opening of the filter used is not particularly limited. In general, an absolute filtration accuracy is from 0.5 μm to 50 μm, and preferably from 0.5 μm to 20 μm. The absolute filtration accuracy means a particle size that the rejection when particles are passed through a filter is 99% or more.

When the carbonic diester filtered with a given filter is additionally added in the raw material preparation step or the subsequent steps, the raw material molar ratio between the carbonic diester and the aromatic dihydroxy compound (carbonic diester/aromatic dihydroxy compound) in the whole mixture of raw materials is previously set to a given value (setting raw material molar ratio) selected from a range of from 1.0 to 1.3, preferably from 1.00 to 1.30, and more preferably from 1.001 to 1.300. It is preferable to additionally add the carbonic diester such that the raw material molar ratio between the carbonic diester and the aromatic dihydroxy compound is the previously selected setting raw material molar ratio, in the step of the raw material preparation step or the subsequent steps. In this case, it is preferable to maintain the accuracy of variation in the setting raw material molecular ratio in a value within ±0.8.

Each step of the production method is described below.
(Raw Material Preparation Step)

An aromatic dihydroxy compound and a carbonic diester used as raw materials of an aromatic polycarbonate are generally prepared as a molten mixture using a batchwise, semi-batchwise or continuous stirring tank type apparatus in an atmosphere of an inert gas such as nitrogen or argon in the absence of an ester exchange catalyst. For example, in the case of using bisphenol A as the aromatic dihydroxy compound and diphenyl carbonate as the carbonic diester, temperature of the molten mixture is selected from a range of generally from 120 to 180° C., and preferably from 125 to 160° C.

In this case, proportions of the aromatic dihydroxy compound and the carbonic diester are adjusted such that the carbonic diester is excess, and are adjusted such that the carbonic diester is in a proportion of generally from 1.01 to 1.30 mol, and preferably from 1.02 to 1.20 mol, per mole of the aromatic dihydroxy compound.
(Polycondensation Step)

Polycondensation by an ester exchange reaction between the aromatic dihydroxy compound and the carbonic diester is continuously conducted by multiple steps of generally 2 steps or more, and preferably from 3 to 7 steps, in the respective each line. Specific reaction conditions are that temperature is in a range of from 150 to 320° C., pressure is in a range of from normal pressures to 0.01 Torr ($1.33 \times 10^{-3}$ kPa), and an average residence time is in a range of from 5 to 150 minutes.

In each reactor when the polycondensation step is conducted in multistage method, further high temperature and further high vacuum are generally set stepwise within the above reaction conditions in order to effectively discharge phenol by-produced with the progress of the polycondensation reaction. It is preferable to set low temperature as possible and a short residence time as possible to prevent deterioration of quality such as hue of the aromatic polycarbonate obtained.

When the polycondensation step is conducted by a multistage method, a plurality of vertical reactors and/or the subsequent at least one horizontal reactor are provided, thereby increasing an average molecular weight of a polycarbonate resin. The reactors provided are generally 3 to 6, and preferably 4 to 5.

The reactors used include a stirring tank type reactor, a thin film reactor, a centrifugal thin film evaporation reactor, a surface renewal type twin-screw kneading reactor, a twin-screw horizontal stirring reactor, a wet wall type reactor, a perforated plate type reactor which polymerizes while freely dropping, and a wire-equipped perforated plate type reactor which polymerizes while dropping along the wire.

Examples of the type of the stirring blade in the vertical reactor include a turbine blade, paddle blade, a fardler blade, an anchor blade, a FULLZONE blade (manufactured by Shinko Pantek Co., Ltd.), a sanmeler blade (manufactured by Mitsubishi Heavy Industries, Ltd.), a MAXBLEND blade (manufactured by Sumitomo Heavy Industries, Ltd.), a helicalribbon blade, and a lattice-type twisting blade (manufactured by Hitachi, Ltd.).

Further, the horizontal reactor means a reaction tank that an axis of revolution of a stirring blade is horizontal (horizontal direction). Examples of the stirring blade in the horizontal reaction tank include single shaft stirring blades such as a disc type and a paddle type, and two-shaft stirring blades such as HVR, SCR and N-SCR (manufactured by Mitsubishi Heavy Industries, Ltd.), Bivolac (manufactured by Sumitomo Heavy Industries, Ltd.), and a spectacle-shaped blade and a lattice-type blade (manufactured by Hitachi, Ltd.).

The ester exchange catalyst used in polycondensation of the aromatic dihydroxy compound and the carbonic diester compound is generally previously provided as an aqueous solution. Concentration of the catalyst aqueous solution is not particularly limited, and adjusted to an optional concentration according to solubility of a catalyst in water. Other organic solvent such as acetone, alcohol, toluene or phenol can be used in place of water.

Properties of water used for dissolution of the catalyst are not particularly limited so far as kind and concentration of impurities contained are constant. In general, distilled water, deionized water and the like are preferably used.

(Devolatilization Step)

After the polycondensation step in each line, unreacted raw materials in a molten reactant, an ester exchange catalyst, a hydroxyl compound by-produced in an ester exchange reaction, and a low molecular weight compound such as a polycarbonate oligomer are removed in a devolatilization step. The devolatilization treatment is generally conducted continuously by a bent type extruder.

The extruder can use any type of extruder so far as it is equipped with a bent part, and is not particularly limited. Examples of the extruder include bent type single-screw or multi-screw extruders. In particular, a mating type twin-screw extruder is preferable. Rotating direction of the axis of the extruder may be the same direction rotation or the different direction rotation. The number of bent is generally multiple bents of from 2 to 10.

In the devolatilization step, it is preferable to neutralize and deactivate the residual basic ester exchange catalyst in the aromatic polycarbonate after the polycondensation reaction with an end terminator such as an acidic compound and its derivatives. This can suppress a side-reaction during devolatilization, and remove residual unreacted raw materials and hydroxy compound.

The acidic compound or its derivatives added in the devolatilization step can use any compounds so far as it neutralizes a basic ester exchange catalyst, and is not particularly limited. Examples of the compound include Brønsted acids such as hydrochloric acid, nitric acid, boric acid, sulfuric acid, sulfurous acid, phosphoric acid, phosphorous acid, hypophosphorous acid, polyphosphoric acid, adipic acid, ascorbic acid, asparatic acid, azelaic acid, adenosine phosphate, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid; and esters thereof. Those acidic compounds or derivatives thereof may be used alone or as mixtures of two or more thereof. Of those acidic compounds or derivatives thereof, sulfonic acids or esters thereof are preferable, and p-toluenesulfonic acid, methyl p-toluenesulfonate, butyl p-toluenesulfonate and the like are particularly preferable.

A solvent which dissolves the acidic compound or its derivatives is not particularly limited so far as it dissolves the acidic compound or its derivatives. Above all, water is preferable. A water-insoluble acidic compound or its derivatives can use a mixed solvent of water and an organic solvent such as acetone added thereto. Those acidic compounds or derivatives thereof are added in a range of from 0.1 to 50 times, and preferably from 0.5 to 30 times, per the neutralization equivalent of the basic ester exchange catalyst used in the polycondensation reaction.

When an extruder equipped with multistage bend ports is used in the devolatilization step, the acidic compound or its derivative is generally added short of the bent port nearest a resin supply port. Embodiments of the aromatic polycarbonate subjected to a neutralization devolatilization treatment by the extruder include a method of introducing into the extruder and treating, during a molten state just after polymerization, and a method of once cooling and solidifying, and then introducing into an extruder and treating.

(Pelletization Step)

The strand-shaped aromatic polycarbonate discharged from the extruder in the devolatilization step is generally palletized by a strand cutter through a strand bath, subjected to water removal by dehydrator or the like, and then placed in a product silo.

(Production Apparatus of Aromatic Polycarbonate)

The continuous production method of an aromatic polycarbonate to which the present embodiment is applied is described below based on the drawings.

Figure 1:
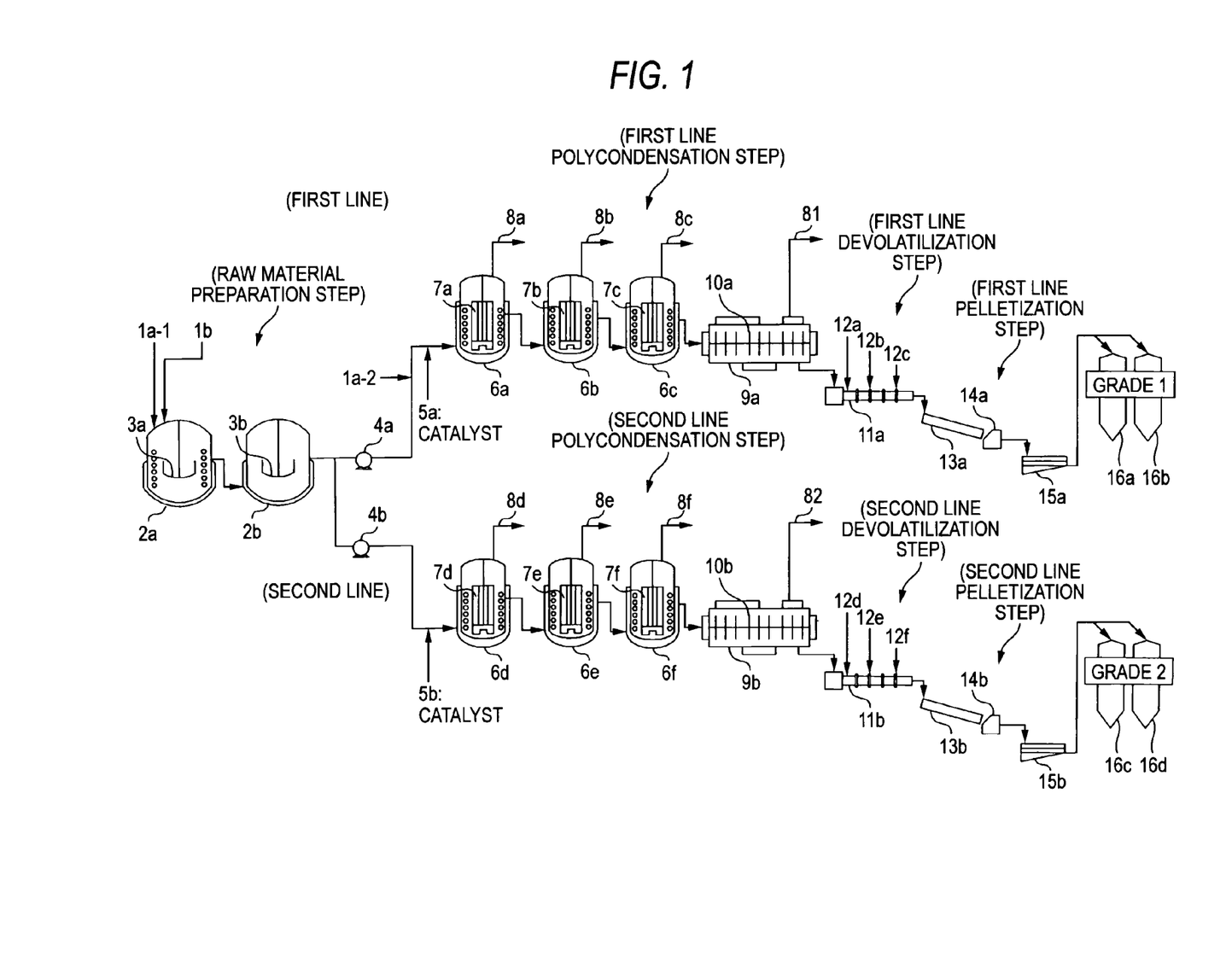
FIG. 1 is a view showing one embodiment of a production apparatus of an aromatic polycarbonate, having two lines of polycondensation steps.

FIG. 1 is a view showing one example of the production apparatus of an aromatic polycarbonate, having two lines of polycondensation steps. In the production apparatus shown in FIG. 1, two kinds of the polycarbonate resins having different quality are produced through one raw material preparation step of preparing a mixture containing the aromatic dihydroxy compound and the carbonic diester as the raw materials in the absence of an ester exchange catalyst, and two lines of polycondensation steps (first line polycondensation step and second line polycondensation step) of polycondensation reacting those raw materials in a molten state respectively using plural reactors.

Subsequently, the two kinds of aromatic polycarbonates are passed through devolatilization steps (first line devolatilization step and second line devolatilization step) of removing unreacted raw materials and reaction by-products in the molten reactant, and pelletization steps (first line pelletization step and second line pelletization step), thereby producing pellets of two kinds of aromatic polycarbonates, respectively.

The present embodiment has the characteristic in using a mixture of raw materials prepared in one raw material preparation step which prepares the raw material in the absence of an ester exchange catalyst, and then conducting polycondensation reaction of the aromatic dihydroxy compound and the carbonic diester compound in two lines (first line and second line) of polycondensation under the respective different polymerization conditions.

Subsequent to one raw material preparation step of preparing the raw material in the absence of an ester exchange catalyst, in two lines of polycondensation steps, aromatic polycarbonates having the respective quality are produced in every line.

The problems of changeover loss and quality deterioration in the case of production using a production apparatus having a single polycondensation step are overcome by conducting polycondensation reaction of the aromatic dihydroxy compound and the carbonic diester compound in two lines of polycondensation. For example, plural aromatic polycarbonates having different average molecular weight and number of end groups can continuously be produced simultaneously with good efficiency in a stable manner.

Next, constitution of the production apparatus of the aromatic polycarbonate is described.

As shown in FIG. 1, a first raw material mixing tank 2a and a second raw material mixing tank 2b which are melt mixing tanks and are connected in series are provided in a raw material preparation step. Further, raw material supply pumps 4a and 4b for supplying the raw material prepared to two lines (first line and second line) of polycondensation steps (first line polycondensation step and second line polycondensation step) respectively are provided. For example, anchor type stirring blades 3a and 3b are provided in the first raw material mixing tank 2a and the second raw material mixing tank 2b, respectively.

The carbonic diester compound and the aromatic dihydroxy compound are used as raw materials of the aromatic polycarbonate. Those are continuously introduced into the first raw material mixing tank 2a from a raw material supply port, respectively, in order to prepare the mixture of raw materials supplied to the polycondensation step. Those raw material compounds are generally solid at ordinary temperature. Therefore, at least one of the raw materials is previously heat melted and introduced.

In general, of the two raw materials, the carbonic diester compound has a melting point lower than that of the aromatic polycarbonate, and further, the aromatic dihydroxy compound is liable to decompose when melted. Therefore, in general, the carbonic diester compound is previously heat melted and introduced, and the aromatic dihydroxy compound is introduced in a form of solid.

In the present embodiment, diphenyl carbonate (hereinafter sometimes referred to as DPC) which is a carbonic diester is supplied in a melt state to the first raw material mixing tank 2a from DPC supply port 1a-1, and bisphenol A (hereinafter sometimes referred to as BPA) which is an aromatic dihydroxy compound is supplied in a powder state from BPA supply port 1b.

Next, the polycondensation step having two lines is described. A first vertical reactor 6a, a second vertical reactor 6b and a third vertical reactor 6c having MAXBLEND blades 7a, 7b and 7c, respectively, connected in series, which are polycondensation reactors, and a fourth horizontal reactor 9a having a lattice-type blade 10a are provided in a first line polycondensation step of a first line. Four reactors are provided with by-product discharge pipes 8a, 8b, 8c and 81, respectively. Those by-product discharge pipes are connected to condensers (not shown), respectively, and each reactor maintains a given reduced pressure state by a pressure reducing device (not shown).

Next, an extruder 11a having additive supply ports 12a, 12b and 12c are provided in a first line devolatilization step.

A strand bath 13a which cools a strand-shaped aromatic polycarbonate discharged from the extruder 11a, a strand cutter 14a which cuts the cooled strand into a given particle size, a centrifugal dehydrator 15a for removing moisture in pellets, and product silos 16a and 16b in which dried pellets are placed are provided in a first line pelletization step.

A first vertical reactor 6d, a second vertical reactor 6e and a third vertical reactor 6f having MAXBLEND blades 7d, 7e and 7f, respectively, connected in series, and a fourth horizontal reactor 9b having a lattice-type blade 10b are provided in a second line polycondensation step of a second line, similar to the first line as described above. Four reactors are provided with by-product discharge pipes 8d, 8e, 8f and 82, respectively. Those by-product discharge pipes are connected to condensers (not shown), respectively, and each reactor maintains a given reduced pressure state by a pressure reducing device (not shown).

Next, an extruder 11b having additive supply ports 12d, 12e and 12f are provided in a second line devolatilization step.

A strand bath 13b, a strand cutter 14b, a centrifugal dehydrator 15b and product silos 16c and 16d are provided in a second line pelletization step.

Next, a step for producing an aromatic polycarbonate in the production apparatus of an aromatic polycarbonate shown in FIG. 1 is described.

As shown in FIG. 1, a DPC melt prepared at a given temperature in a nitrogen gas atmosphere, and a BPA powder weighed in a nitrogen gas atmosphere are continuously supplied to the first raw material mixing tank 2a from a DPC supply port 1a-1 and a BPA supply port 1b, respectively, in the raw material preparation step. The DPC melt and the BPA powder are mixed in the first raw material mixing tank 2a in the absence of an ester exchange catalyst. When liquid level of the first raw material mixing tank 2a exceeds the same height as the highest level in a transfer piping, the mixture of raw materials is transferred to the second raw material mixing tank 2b, and further stirred and mixed therein.

Next, the mixture of raw materials is continuously supplied to the first vertical reactor 6a of the first line through the raw material supply pump 4a. Further, the mixture of raw materials is also continuously supplied to the first vertical reactor 6b of the second line through the raw material supply pump 4b.

In the first line, the DPC melt prepared at a given temperature is supplied from a DPC supply port 1a-2 provided in the course of a transfer piping which connects the raw material supply pump 4a and the first vertical reactor 6a.

In the first line, the molar ratio of (DPC/BPA) mixture prepared in the raw material preparation step described above is varied according to need by supplying the DPC melt from the DPC supply port 1a-2, and as a result, an aromatic polycarbonate having optional quality can be polycondensed.

The supply port of the DPC melt is not limited to provide before the first vertical reactor 6a, and can be provided, for example, between the first vertical reactor 6a and the second vertical reactor 6b, and between the second vertical reactor 6b and the third vertical reactor 6c, according to need. Further, the number of the supply port of the DPC melt can appropriately be selected according to need.

In the second line described hereinafter, similar to the first line, the molar ratio of (DPC/BPA) mixture prepared in the raw material preparation step described above can be controlled according to need by providing a given DPC supply port and supplying the DPC melt.

Further, in the first line, cesium carbonate in a form of an aqueous solution as an ester exchange catalyst is continuously supplied from a catalyst supply port 5a provided before the first vertical reactor 6a in the transfer piping. Similarly, in the second line, the cesium carbonate is continuously supplied from a catalyst supply port 5b provided before the first vertical reactor 6d in the transfer piping.

The continuous production method of an aromatic polycarbonate to which the present embodiment is applied has the characteristic that the (DPC/BPA) mixture is prepared in the first raw material mixing tank 2a and the second raw material mixing tank 2b of the raw material preparation step without contacting the raw material and the ester exchange catalyst, and in the polycondensation steps of plural lines, the ester exchange catalyst is supplied to the respective lines, thereby proceeding the polycondensation reaction.

The amount of the ester exchange catalyst supplied to each line of the polycondensation steps of plural lines is appropriately selected according to quality of an aromatic polycarbonate produced in each line, and is not particularly limited. Further, the number of the supply port of the ester exchange catalyst is not limited, and, for example, it is possible to provide a plurality of catalyst supply ports and supply the ester exchange catalyst by dividing the same.

Further, in the second line described hereinafter, given catalyst ports can be provided to supply the ester exchange catalyst, similar to the first line.

Subsequently, the first line polycondensation step is described, and reference numerals and signs of the second line are shown by brackets. In the first vertical reactor 6a (6d), for example, temperature of 220° C., pressure of 13.33 kPa (100 Torr) and blade revolutions of 160 rpm are maintained, liquid level is maintained constant so as to be an average residence time of 60 minutes while distilling by-produced phenol from the by-product discharge pipe 8a (8d), and polycondensation reaction is conducted, in a nitrogen atmosphere. Next, the molten reactant discharged from the first vertical reactor 6a (6d) is then continuously supplied to the second vertical reactor 6b (6e), the third vertical reactor 6c (6f) and the fourth horizontal reactor 9a (9b), successively, and polycondensation reaction proceeds. Reaction conditions in each reactor are set respectively so as to be high temperature, high vacuum and low stirring rate with the progress of the polycondensation reaction. During the polycondensation reaction, liquid level is controlled, for example, such that the average residence time in each reactor is about 60 minutes, and in each reactor, the by-produced phenol is distilled away from the by-product discharge pipes 8b, 8c and 8l (8e, 8f and 82).

In the present embodiment, by-products such as phenol are continuously liquefied and recovered from condensers (not shown) fixed to the first vertical reactor 6a (6d) and the second vertical reactor 6b (6e), respectively. Further, cold traps (not shown) are provided in condensers (not shown) fixed to the third vertical reactor 6c (6f) and the fourth horizontal reactor 9a (9b), respectively, and by-products are continuously liquefied and recovered.

Next, the aromatic polycarbonate drawn out of the fourth horizontal reactor 9a (9b) is supplied in a form of molten state to a twin-screw extruder 11a (11b) equipped with three-stage bent ports. Various additives such as butyl p-toluenesulfonate, tris(2,4-di-t-butylphenyl)-phosphite and stearic acid monoglyceride are supplied to the extruder 11a (11b) from additive supply ports 12a, 12b and 12c (12d, 12e and 12f), respectively. Conditions of the extruder 11a are set to, for example, a discharge amount of 50 kg/hr, the number of revolutions of 150 rpm and the maximum resin temperature of about 278° C.

In the present embodiment, it is possible to supply, for example, thermoplastic resins other than an aromatic polycarbonate from the additive supply ports 12a, 12b and 12c (12d, 12e and 12f) of the extruder 11a (11b), and prepare a polymer alloy or the like.

Next, the strand-shaped aromatic polycarbonate discharged from the extruder 11a (11b) is palletized with the strand cutter 14a (14b) through the strand bath 13a (13b), and after removal of water with the centrifugal dehydrator 15a (15b), the pellets are introduced into product silos 16a and 16b (16c and 16d).

Thus, the present embodiment describes in detail with respect to a method of producing aromatic polycarbonates having different quality in a production apparatus having polycondensation steps of two lines subsequent to one raw material preparation step which prepares the raw material in the absence of an ester exchange catalyst, but the number of line of the polycondensation steps can be increased according to need.

Further, the present embodiment describes the embodiment of simultaneously producing two kinds of aromatic polycarbonates having different quality with the polycondensation steps of two lines, but according to need, it is possible to produce the same kind of an aromatic polycarbonate with two parallel line polycondensation steps.

The present invention is described further specifically based on the Examples. However, the invention is not limited to the following Examples so far as it does not depart from its gist.

(1) Viscosity Average Molecular Weight (Mv) of Aromatic Polycarbonate

The viscosity average molecular weight (Mv) of an aromatic polycarbonate was obtained by measuring a limiting viscosity [η] at 20° C. in methylene chloride using Ubbellohde viscometer, and calculating with the following equation.

$$[\eta]=1.23\times10^{-4}\times(Mv)^{0.83}$$

(2) Terminal Hydroxyl Group Concentration of Aromatic Polycarbonate

The terminal hydroxyl group concentration of an aromatic polycarbonate was measured by conducting coloriometric determination according to titanium tetrachloride/acetic acid method (see Makromol. Chem. 88, 215 (1965)).

(3) Hue of Aromatic Polycarbonate

The hue of an aromatic polycarbonate was measured as follows. A sheet having a thickness of 3 mm and 100 mm square was prepared by molding an aromatic polycarbonate using an injection molding machine (J100SS-2, a product of The Japan Steel Works, Ltd.) under conditions of a barrel temperature of 280° C. and a mold temperature of 90° C. Tristimulus value XYZ of the sheet which is an absolute value of color was measured with a color tester (SC-1-CH, a product of Suga Test Co., Ltd.), and YI value which is an indicator of yellowness was calculated with the following relational expression.

$$YI=(100/Y)\times(1.28X-1.06Z)$$

It is indicated that coloration increases with the increase of the YI value.

Example 1

An aromatic polycarbonate was produced as follows by a production apparatus of an aromatic polycarbonate, having polycondensation steps of two lines, as shown in FIG. 1.

(Raw Material Solution Preparation)

DPC melt prepared at 120° C. in a nitrogen gas atmosphere and BPA powder weighed in a nitrogen gas atmosphere were supplied to the first raw material mixing tank 2a from the DPC supply port 1a-1 and the BPA supply port 1b, respectively. DPC and BPA were weighed with a micromotion flowmeter and a loss-in-weight type weight feeder such that the supply rate of DPC is 87.7 kg/hr and the supply rate of BPA is 89.8 kg/hr (DPC/BPA molar ratio: 1.040). The first raw material mixing tank 2a was set to 140° C. at normal pressures in a nitrogen atmosphere. The tank has an inner volume of 0.4 m³ and is equipped with an anchor type stirring blade 3a. In this case, an ester exchange catalyst is not present in the first raw material mixing tank 2a.

When liquid level of the first raw material mixing tank 2a exceeds the same level as the maximum level in the transfer piping (corresponding to an inner volume of 0.26 m³ of the first raw material preparation tank 2a), the mixture of raw materials is transferred into the second raw material mixing tank 2b. The second raw material mixing tank 2b is set to 140° C. at normal pressures in a nitrogen atmosphere. The tank has an inner volume of 0.4 m³, and is equipped with an anchor type stirring blade 3b.

The total residence time of the mixture of raw materials required to pass through the first raw material mixing tank 2a and the second raw material mixing tank 2b was 160 minutes. The mixture of raw materials does not show the progress of an ester exchange reaction, and reaction rate of BPA was 0%.

(Polycondensation Reaction)

Next, the above mixture of raw materials was passed through the raw material supply pumps 4a and 4b, respectively, and every half (½) of the mixture of raw materials having the same flow rate (88.8 kg/hr) was continuously supplied to the first vertical reactor 6a of the first line and the first vertical reactor 6d of the second line, respectively. The first vertical reactor 6a and the first vertical reactor 6d are equipped with MAXBLEND blades 7a and 7d, respectively, and have an inner volume of 0.1 m³.

Simultaneously, the DPC melt prepared at 120° C. in a nitrogen gas atmosphere was supplied to the first line from a DPC supply port 1a-2 provided in the course of a transfer piping of the mixture of raw materials at a flow rate of 1.03 kg/hr such that (DPC/BPA) molar ratio of the whole mixture of raw materials is 1.065.

Further, a cesium carbonate aqueous solution (concentration: 0.011%) as the ester exchange catalyst was continuously supplied in the first line from the catalyst supply port 5a provided after the DPC supply port 1a-2 on the transfer piping of the mixture of raw materials, and in the second line from the catalyst supply port 5b provided just before the first vertical reactor 6d on the transfer piping at 204 ml/hr ($0.35 \times 10^{-6}$ mol per mole of BPA) and 292 ml/hr ($0.50 \times 10^{-6}$ mol per mole of BPA), respectively.

(First Line)

The first vertical reactor 6a of the first line kept temperature of 220° C., pressure of 13.33 kPa (100 Torr) and blade revolutions of 160 rpm in a nitrogen atmosphere, and maintained liquid level constant such that the average residence time is 60 minutes while distilling by-produced phenol from the by-product discharge pipe 8a.

The molten reactant discharged from the first vertical reactor 6a was continuously supplied to the second vertical reactor 6b having an inner volume of 0.1 m³ equipped with the MAXBLEND blade 7b, the third vertical reactor 6c and the fourth horizontal reactor 9a having an inner volume of 0.15 m³ equipped with the lattice-type blade 10a, successively.

Polycondensation reaction conditions in the second vertical reactor 6b, the third vertical reactor 6c and the fourth horizontal reactor 9a were set to the following conditions, respectively, so as to be high temperature, high vacuum and low stirring rate with the progress of the reaction.

Second vertical reactor 6b: Temperature 240° C., pressure 2.00 kPa (15 Torr), number of revolutions of blade 131 rpm Third vertical reactor 6c: Temperature 260° C., pressure 0.09 kPa (0.7 Torr), number of revolutions of blade 44 rpm Fourth horizontal reactor 9a: Temperature 265° C., pressure 0.09 kPa (0.7 Torr), number of revolutions of blade 5 rpm During the polycondensation reaction in each reactor, liquid level was controlled such that the average residence time in each reactor is 60 minutes. Further, by-produced phenol in each reactor was distilled.

The aromatic polycarbonate drawn out of the fourth horizontal reactor 9a was supplied in a molten state to the twin-screw extruder 11a equipped with three-stage vent ports (a product of Kobe Steel, Ltd., screw diameter: 0.046 m, L/D=36). Butyl p-toluenesulfonate, tris(2,4-di-t-butylphenyl)phosphite and stearic acid monoglyceride were supplied to the extruder 11a from the additive supply ports 12a, 12b and 12c, respectively. Supply amounts of those compounds were the concentrations of 5 ppm, 50 ppm and 350 ppm to the aromatic polycarbonate, respectively, and those compounds were quantitatively supplied.

Extrusion conditions of the extruder 11a were discharge amount 50 kg/hr, the number of revolutions 150 rpm and the maximum resin temperature 278° C.

The strand-shaped aromatic polycarbonate discharged from the extruder 11a was passed through the strand bath 13a and pelletized with the strand cutter 14a. After removal of water in the pellets with the centrifugal dehydrator 15a, the pellets were introduced into the product silos 16a and 16b. The aromatic polycarbonate having the following properties was continuously placed in the product silos 16a and 16b.

Viscosity average molecular weight (Mv): 14,800
Terminal hydroxyl group concentration: 790 ppm
YI (Yellow Index)=1.5

(Second Line)

Next, the first vertical reactor 6d of the second line kept temperature of 220° C., pressure of 13.33 kPa (100 Torr) and blade revolutions of 160 rpm in a nitrogen atmosphere, and maintained liquid level constant such that the average residence time is 60 minutes while distilling by-produced phenol from the by-product discharge pipe 8d.

The molten reactant discharged from the first vertical reactor 6d was continuously supplied to the second vertical reactor 6e having an inner volume of 0.1 m³ equipped with the MAXBLEND blade 7e, the third vertical reactor 6f and the fourth horizontal reactor 9b having an inner volume of 0.15 m³ equipped with the lattice-type blade 10b, successively.

Similar to the first line described above, polycondensation reaction conditions in the second vertical reactor 6e, the third vertical reactor 6f and the fourth horizontal reactor 9b were set to the following conditions, respectively, so as to be high temperature, high vacuum and low stirring rate with the progress of the reaction.

Second vertical reactor 6e: Temperature 240° C., pressure 2.00 kPa (15 Torr), number of revolutions of blade 131 rpm Third vertical reactor 6f: Temperature 270° C., pressure 0.13 kPa (1.0 Torr), number of revolutions of blade 44 rpm Fourth horizontal reactor 9b: Temperature 280° C., pressure 0.13 kPa (1.0 Torr), number of revolutions of blade 5 rpm During the polycondensation reaction in second line, liquid level was controlled such that the average residence time in each reactor is 60 minutes. Further, by-produced phenol in each reactor was distilled.

The aromatic polycarbonate drawn out of the fourth horizontal reactor 9b was supplied in a molten state to the twin-screw extruder 11b equipped with three-stage vent ports (a product of Kobe Steel, Ltd., screw diameter: 0.046 m, L/D=36).

Butyl p-toluenesulfonate and tris(2,4-di-t-butylphenyl)phosphite were supplied to the extruder 11b from the additive supply ports 12d and 12e, respectively. Supply amounts of those compounds were the concentrations of 5 ppm and 200 ppm to the aromatic polycarbonate, respectively, and those compounds were quantitatively supplied.

Extrusion conditions of the extruder 11b were discharge amount 50 kg/hr, the number of revolutions 150 rpm and the maximum resin temperature 285° C.

The strand-shaped aromatic polycarbonate discharged from the extruder 11b was passed through the strand bath 13b and pelletized with the strand cutter 14b. After removal of water in the pellets with the centrifugal dehydrator 15b, the pellets were introduced into the product silos 16c and 16d. The aromatic polycarbonate having good hue having the following properties were continuously placed in the product silos 16c and 16d.

Viscosity average molecular weight (Mv): 21,900
Terminal hydroxyl group concentration: 900 ppm
YI (Yellow Index)=1.6

Thus, in the present Example, two kinds of polycarbonates having different viscosity average molecular weight (Mv) and terminal hydroxyl group concentration, and containing different kind and amount of the additives could simultaneously be produced.

Next, using the production apparatus of an aromatic polycarbonate shown in FIG. 1, the production was carried out by changing pressures of the third vertical reactor 6f and the fourth horizontal reactor 9b in the second line after the continuous operation of about 200 hours to 0.067 kPa (0.5 Torr), but without changing other conditions.

As a result, an aromatic polycarbonate having good hue and having the following properties was obtained by the production apparatus of the second line.

Viscosity average molecular weight (Mv): 22,300
Terminal hydroxyl group concentration: 300 ppm
YI (Yellow Index)=1.6

In the second line, changeover loss of the molecular weight of the aromatic polycarbonate obtained was not generated by changing only reaction pressure in the third vertical reactor 6f and the fourth horizontal reactor 9b.

In this case, because the production conditions in the first line were not changed, change in properties of the aromatic polycarbonate was not recognized.

Comparative Example 1

Next, an embodiment of producing an aromatic polycarbonate by a production apparatus having only one line of polycondensation step is described.

Figure 2:
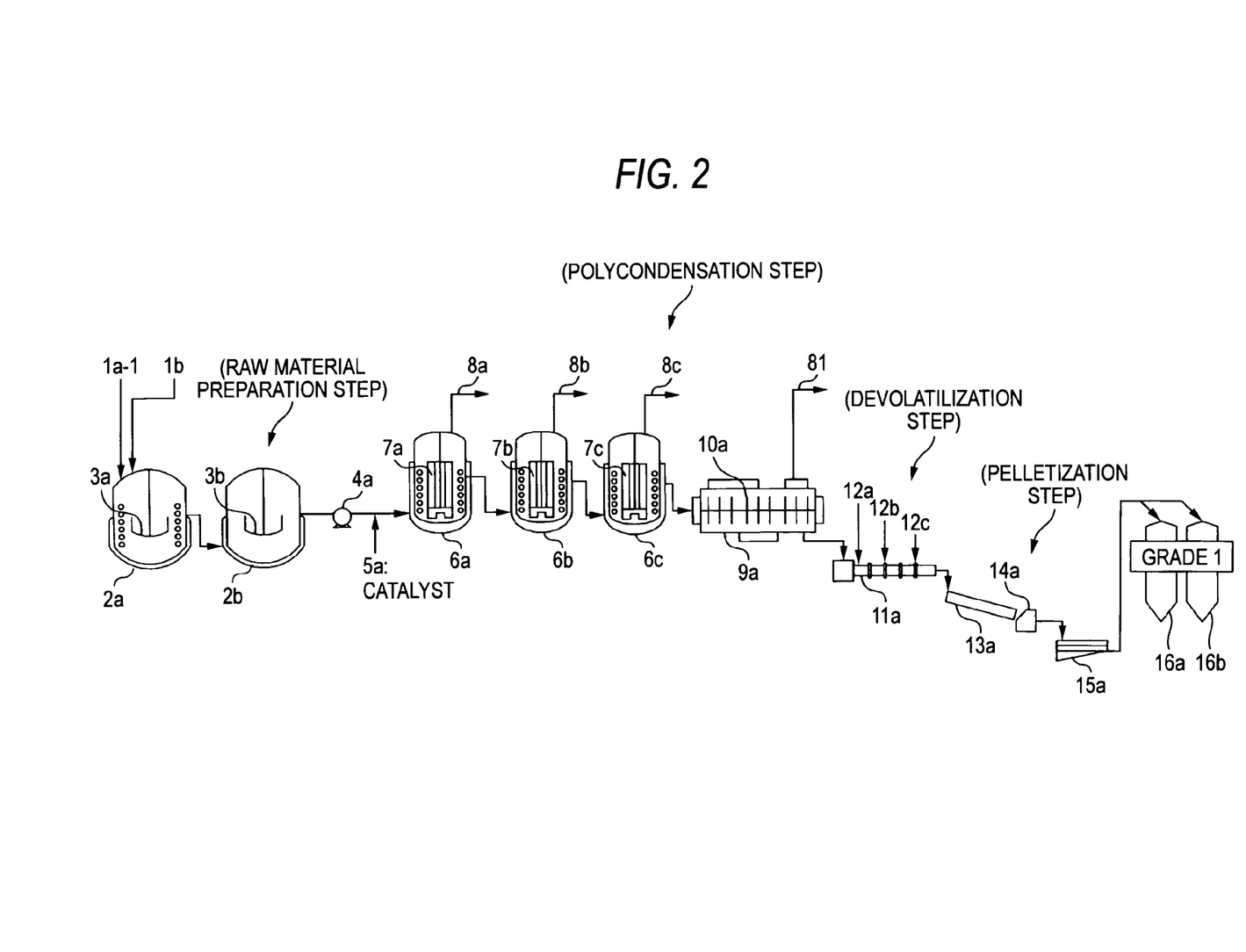
FIG. 2 is a view explaining a production apparatus of an aromatic polycarbonate, having one line of polycondensation step per one line of a raw material preparation step.

FIG. 2 is a view explaining a production apparatus of an aromatic polycarbonate, having one line of polycondensation step per one line of a raw material preparation step. Specifications in each unit are the same as the raw material preparation step and the first line in the production apparatus of an aromatic polycarbonate used in Example 1, and reference numerals and signs used are also the same.

In the production apparatus of an aromatic polycarbonate shown in FIG. 2, the operation of polycondensation was conducted under the same conditions as the production conditions in the first line of Example 1, except that the number of revolutions of blade in the fourth horizontal reactor 9a of the polycondensation step was changed to 10 rpm and the DPC melt was not supplied from 1a-2, and an aromatic polycarbonate having good hue and having the following properties was continuously obtained.

Viscosity average molecular weight (Mv): 21,200
Terminal hydroxyl group concentration: 200 ppm
YI (Yellow Index)=1.6

Next, to subsequently produce an aromatic polycarbonate having a viscosity average molecular weight (Mv) of 15,000 after continuing the continuous operation for 200 hours, the production conditions of the raw material preparation step and the polycondensation step were changed as follows.

DPC melt prepared at 120° C. in a nitrogen gas atmosphere and BPA powder weighed in a nitrogen gas atmosphere were supplied to the first raw material mixing tank 2a from the DPC supply port 1a-1 and the BPA supply port 1b, respectively. DPC and BPA were weighed with a micromotion flowmeter and a loss-in-weight type weight feeder such that the supply rate of DPC is 88.7 kg/hr and the supply rate of BPA is 89.8 kg/hr (DPC/BPA molar ratio: 1.065). The first raw material mixing tank 2a was set to 140° C. at normal pressures in a nitrogen atmosphere. The tank is equipped with an anchor type stirring blade 3a.

When liquid level of the first raw material mixing tank 2a exceeds the same level as the maximum level in the transfer piping (corresponding to an inner volume of 0.26 m³ of the first raw material preparation tank 2a), the mixture of raw materials is transferred into the second raw material mixing tank 2b. The second raw material mixing tank 2b is set to 140° C. at normal pressures in a nitrogen atmosphere. The tank has an inner volume of 0.4 m³, and is equipped with an anchor type stirring blade 3b.

The total residence time of the mixture of raw materials required to pass through the first raw material mixing tank 2a and the second raw material mixing tank 2b was 160 minutes. The mixture of raw materials does not show the progress of an ester exchange reaction, and reaction rate of BPA was 0%.

Next, the above mixture of raw materials was passed through the raw material supply pump 4a, and was continuously supplied to the first vertical reactor 6a. The first vertical reactor 6a is equipped with MAXBLEND blade 7a, and has an inner volume of 0.1 m³.

Further, a cesium carbonate aqueous solution (concentration: 0.011%) as the ester exchange catalyst was continuously supplied from the catalyst supply port 5a provided just before the first vertical reactor 6a on the transfer piping at 292 ml/hr ($0.50 \times 10^{-6}$ mol per mole of BPA).

The first vertical reactor 6a kept temperature of 220° C., pressure of 13.33 kPa (100 Torr) and blade revolutions of 160 rpm in a nitrogen atmosphere, and maintained liquid level constant such that the average residence time is 60 minutes while distilling by-produced phenol from the by-product discharge pipe 8a.

The molten reactant discharged from the first vertical reactor 6a was continuously supplied to the second vertical reactor 6b having an inner volume of 0.1 m³ equipped with the MAXBLEND blade 7b, the third vertical reactor 6c and the fourth horizontal reactor 9a having an inner volume of 0.15 m³ equipped with the lattice-type blade 10a, successively.

Polycondensation reaction conditions in the second vertical reactor 6b, the third vertical reactor 6c and the fourth horizontal reactor 9a were set to the following conditions, respectively, so as to be high temperature, high vacuum and low stirring rate with the progress of the reaction.

Second vertical reactor 6b: Temperature 240° C., pressure 2.00 kPa (15 Torr), number of revolutions of blade 131 rpm Third vertical reactor 6c: Temperature 260° C., pressure 0.09 kPa (0.7 Torr), number of revolutions of blade 44 rpm Fourth horizontal reactor 9a: Temperature 265° C., pressure 0.09 kPa (0.7 Torr), number of revolutions of blade 5 rpm During the polycondensation reaction, liquid level was controlled such that the average residence time in each reactor is 60 minutes. Further, by-produced phenol in each reactor was distilled.

The aromatic polycarbonate drawn out of the fourth horizontal reactor 9a was supplied in a molten state to the twin-screw extruder 11a equipped with three-stage vent ports (a product of Kobe Steel, Ltd., screw diameter: 0.046 m, L/D=36).

Butyl p-toluenesulfonate and tris(2,4-di-t-butylphenyl) phosphite were supplied to the extruder 11a from the additive supply ports 12a and 12b, respectively. Supply amounts of those compounds were the concentrations of 5 ppm and 50 ppm to the aromatic polycarbonate, respectively, and those compounds were quantitatively supplied.

Extrusion conditions of the extruder 11a were discharge amount 50 kg/hr, the number of revolutions 150 rpm and the maximum resin temperature 278° C.

The strand-shaped aromatic polycarbonate discharged from the extruder 11a was passed through the strand bath 13a and pelletized with the strand cutter 14a. After removal of water in the pellets with the centrifugal dehydrator 15a, the pellets were introduced into the product silos 16a and 16b. The aromatic polycarbonate having the following properties was continuously placed in the product silos 16a and 16b.

Viscosity average molecular weight (Mv): 15,100
Terminal hydroxyl group concentration: 880 ppm
YI (Yellow Index)=1.9

Hue of those aromatic polycarbonates placed in the product silos 16a and 16b deteriorated. Further, in the production operation, about 20 hours were required until the viscosity average molecular weight (Mv) and the terminal hydroxyl group concentration of the aromatic polycarbonate become stable, and the aromatic polycarbonate produced during this period was changeover loss.

Comparative Example 2

Next, an embodiment that the raw materials and the catalyst are mixed in the polycondensation step, and thereafter, aromatic polycarbonates are produced by polycondensation steps of plural lines is described.

Figure 3:
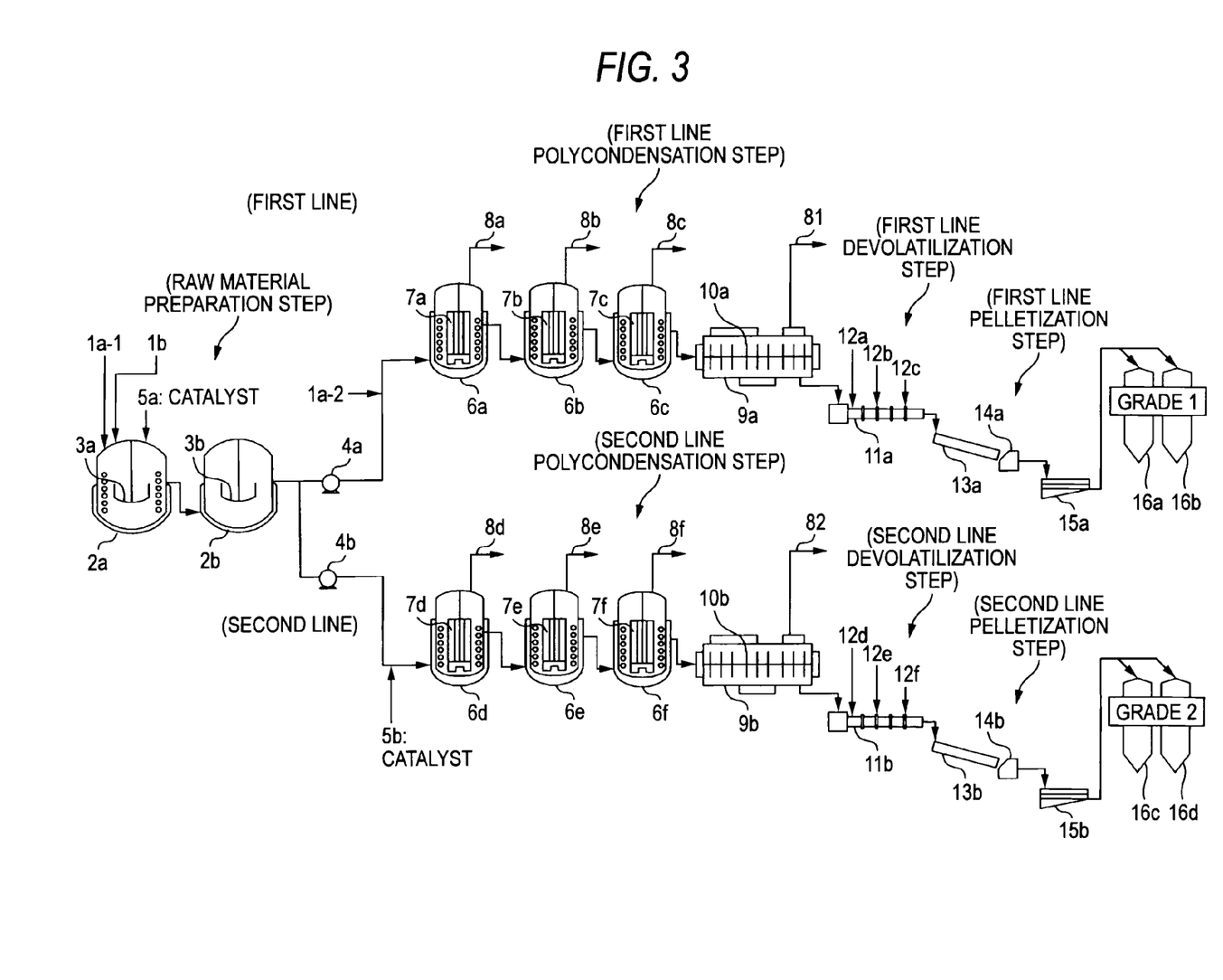
FIG. 3 is a view showing one embodiment of a production apparatus of an aromatic polycarbonate, having one line of a raw material preparation step which prepares a mixture of raw materials and a catalyst, and two lines of polycondensation steps.

FIG. 3 is a view showing one embodiment of a production apparatus of an aromatic polycarbonate, having one line of a raw material preparation step which prepares a mixture of raw materials and a catalyst, and two lines of polycondensation steps. Specifications in each unit are the same as the raw material preparation step, the first line and the second line in the production apparatus of an aromatic polycarbonate used in Example 1, and reference numerals and signs used are also the same.

In the production apparatus of an aromatic polycarbonate shown in FIG. 3, the DPC melt and the BPA powder were supplied to the first raw material mixing tank 2a, and additionally, a cesium carbonate aqueous solution (concentration: 0.011%) as an ester exchange catalyst was continuously supplied to the first raw material mixing tank 2a from the catalyst supply port 5a at 408 ml/hr, in the raw material preparation step.

Further, in the second line, a cesium carbonate aqueous solution (concentration: 0.011%) as an ester exchange catalyst was continuously supplied from the catalyst supply port 5b on a transfer piping provided just before the first vertical reactor 6d at 88 ml/hr.

Two kinds of aromatic polycarbonates having the following different viscosity average molecular weight (Mv) and terminal hydroxyl group concentration were continuously produced simultaneously under the same production conditions in the production apparatus of an aromatic polycarbonate used in Examples 1 except for the above-described production conditions.

First Line
Viscosity average molecular weight (Mv): 13,700
Terminal hydroxyl group concentration: 1,270 ppm
YI (Yellow Index)=2.6

Second Line
Viscosity average molecular weight (Mv): 20,100
Terminal hydroxyl group concentration: 1,020 ppm
YI (Yellow Index)=2.9

It is seen from the above results that in polycondensation based on an ester exchange reaction between an aromatic dihydroxy compound and a carbonic diester, when raw materials and a catalyst are mixed in a raw material preparation step, and thereafter an aromatic polycarbonate is produced by polycondensation steps of two lines as in the production apparatus shown in FIG. 3, the molecular weight of the aromatic polycarbonate does not reach the target, and hue tends to deteriorate in each of the first line and the second line.

Example 2

Next, an embodiment that a carbonic diester filtered with a filter is additionally added in a raw material preparation step or the subsequent steps, and an aromatic polycarbonate is produced by polycondensation steps of plural lines is described.

Figure 4:
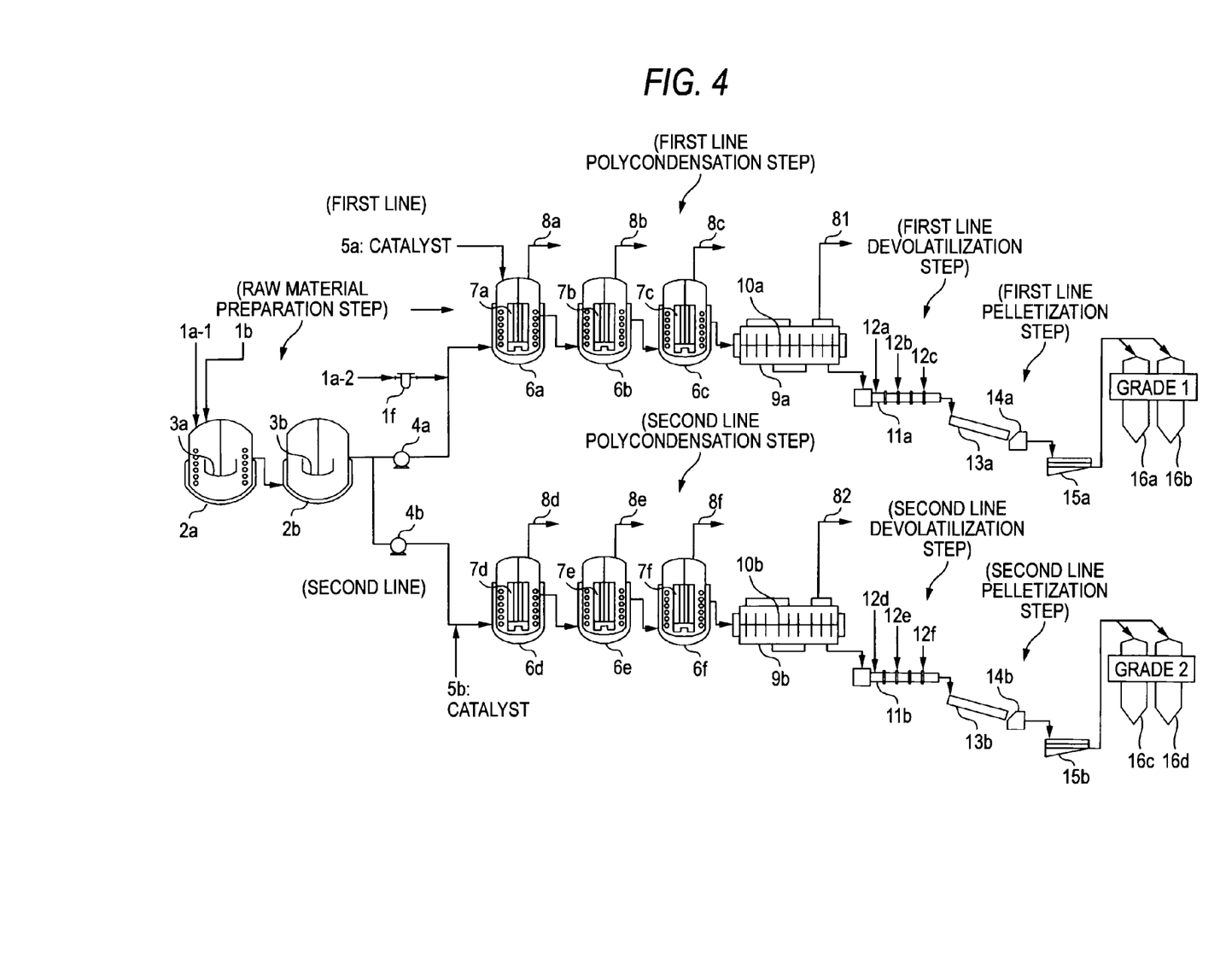
FIG. 4 is a view showing one embodiment of a production apparatus of an aromatic polycarbonate, in which a carbonic diester filtered with a filter is additionally added to a raw material preparation step or the subsequent steps.

FIG. 4 is a view showing one embodiment of a production apparatus of an aromatic polycarbonate, in which a carbonic diester filtered with a filter is additionally added to a raw material preparation step or the subsequent steps. Specifications in each unit are the same as the raw material preparation step, the first line and the second line in the production apparatus of an aromatic polycarbonate used in Example 1, and reference numerals and signs used are also the same.

As shown in FIG. 4, the DPC melt prepared at 120° C. in a nitrogen gas atmosphere was passed through a SUS316L-made filter 1f having an absolute filtration accuracy of 0.5 μm, and then supplied in the first line from the DPC supply port 1a-2 provided in the course of the transfer piping of the mixture of raw materials at a flow rate of 1.03 kg/hr such that (DPC/BPA) molar ratio of the whole mixture of raw materials is 1.065.

Further, a cesium carbonate aqueous solution (concentration: 0.011%) as an ester exchange catalyst was continuously supplied from the catalyst supply port 5a provided at the top of the first vertical reactor 6a at 204 ml/hr ($0.35 \times 10^{-6}$ mol per 1 mol of BPA). Other production conditions in the first line and the second line are the same as in Example 1.

As a result, polycarbonates having good hue and having the same respective properties as in Example 1 were obtained in the first line and the second line.

While the invention has been described in detail and with reference to specific embodiments thereof, it will be apparent to one skilled in the art that various changes or modifications can be made therein without departing from the spirit and scope thereof.

This application is based on Japanese Patent Application (Patent Application No. 2006-203616) filed Jul. 26, 2006 and Japanese Patent Application (Patent Application No. 2006-324382) filed Nov. 30, 2006, the entire contents thereof being hereby incorporated by reference.

INDUSTRIAL APPLICABILITY

According to the present invention, changeover loss and quality deterioration diminishes in a continuous production of an aromatic polycarbonate. Therefore, an industrial value of the present invention is remarkable.

The invention claimed is:

1. A continuous production method of an aromatic polycarbonate, comprising:
   preparing a molten mixture of raw materials comprising an aromatic dihydroxy compound and a carbonic diester in the absence of an ester exchange catalyst; and
   polycondensing the molten mixture of the raw materials in the presence of an ester exchange catalyst in a plurality of reactors provided in plural lines to produce at least one aromatic polycarbonate by melt polycondensation with an ester exchange reaction between the aromatic dihydroxy compound and the carbonic diester,
   wherein the molten mixture of the raw materials is polycondensed in the plural lines per one line of preparation of the molten mixture.

2. The continuous production method of an aromatic polycarbonate as claimed in claim 1, further comprising adding at least one selected from the group consisting of an aromatic dihydroxy compound, a carbonic diester, an ester exchange catalyst, an end terminator, an additive and a thermoplastic resin to the molten mixture of the raw materials while being prepared or thereafter.

3. The continuous production method of an aromatic polycarbonate as claimed in claim 1, wherein plural kinds of aromatic polycarbonate are produced by polycondensing the molten mixture of the raw materials in the plural lines.

4. The continuous production method of an aromatic polycarbonate as claimed in claim 1, further comprising:
   filtering at least one material selected from the group consisting of an aromatic dihydroxy compound, a carbonic diester, an ester exchange catalyst, an end terminator, an additive and a thermoplastic resin; and
   subsequently adding a filtered material to the molten mixture of the raw materials while being prepared or thereafter.

5. The continuous production method of an aromatic polycarbonate as claimed in claim 1, further comprising:
   filtering carbonic diester; and
   adding a filtered carbonic diester to the molten mixture of the raw materials or thereafter in an amount such that a molar ratio of carbonic diester to aromatic dihydroxy compound in the raw materials is from 1.0 to 1.3,
   wherein the molten mixture of the raw materials that comprises the filtered carbonic diester is polycondensed by solution polycondensation in the presence of an ester exchange catalyst.

6. A production apparatus of an aromatic polycarbonate, comprising:
   at least one melt mixing tank configured to prepare a molten mixture of raw materials comprising an aromatic dihydroxy compound and a carbonic diester in the absence of an ester exchange catalyst; and
   polycondensation reactors provided in at least two lines per one line of the at least one melt mixing tank, the polycondensation reactors being configured to continuously polycondensate the molten mixture of the raw materials prepared in the at least one melt mixing tank, in the presence of an ester exchange catalyst.

7. The production apparatus of an aromatic polycarbonate as claimed in claim 6, wherein the polycondensation reactors comprise:
   a plurality of vertical reactors connected in series; and
   at least one horizontal reactor positioned downstream of the vertical reactors.

\* \* \* \* \*